US008005096B2

United States Patent
Hardy et al.

(10) Patent No.: US 8,005,096 B2
(45) Date of Patent: Aug. 23, 2011

(54) NETWORK TUNNELLING

(75) Inventors: William Geoffrey Hardy, Coventry (GB); Vittoriano Grandi, Genoa (IT)

(73) Assignee: Ericsson AB, Stockheim (SE)

( * ) Notice: Subject to any disclaimer, the term of this patent is extended or adjusted under 35 U.S.C. 154(b) by 1609 days.

(21) Appl. No.: 10/472,666

(22) PCT Filed: Mar. 12, 2002

(86) PCT No.: PCT/GB02/01108
§ 371 (c)(1),
(2), (4) Date: Apr. 1, 2004

(87) PCT Pub. No.: WO02/078283
PCT Pub. Date: Oct. 3, 2002

(65) Prior Publication Data
US 2004/0160956 A1 Aug. 19, 2004

(30) Foreign Application Priority Data
Mar. 27, 2001 (GB) .................................. 0107639.7

(51) Int. Cl.
H04L 12/28 (2006.01)
H04L 12/56 (2006.01)
(52) U.S. Cl. ..... 370/400; 370/392; 370/397; 370/395.5; 370/409
(58) Field of Classification Search .................. 370/392, 370/397, 395.5, 400, 409
See application file for complete search history.

(56) References Cited

U.S. PATENT DOCUMENTS

| 6,295,296 | B1 * | 9/2001 | Tappan .......................... 370/392 |
| 6,574,195 | B2 * | 6/2003 | Roberts .......................... 370/235 |
| 6,771,645 | B1 * | 8/2004 | Sasagawa et al. ............. 370/392 |
| 7,012,919 | B1 * | 3/2006 | So et al. ......................... 370/392 |
| 7,054,557 | B1 * | 5/2006 | Dasylva et al. ................ 398/48 |
| 7,319,700 | B1 * | 1/2008 | Kompella ...................... 370/400 |
| 2001/0002192 | A1 * | 5/2001 | Fujita ............................ 370/252 |
| 2001/0019554 | A1 * | 9/2001 | Nomura et al. ............... 370/389 |
| 2001/0033574 | A1 * | 10/2001 | Enoki et al. ................... 370/396 |
| 2002/0055924 | A1 * | 5/2002 | Liming ......................... 707/100 |

FOREIGN PATENT DOCUMENTS

EP 1 067 736 A2 1/2001
JP 2000332777 11/2000

OTHER PUBLICATIONS

Daniel O. Awduche, MPLS and Traffic Engineering in IP Networks, Dec. 1999, IEEE Communications Magazine.*

(Continued)

Primary Examiner — Hassan Phillips
Assistant Examiner — Lonnie Sweet
(74) Attorney, Agent, or Firm — Kirschstein, et al.

(57) ABSTRACT

MPLS labels can be used to tunnel data packets through IP networks. At a start point such as a router or network terminator, the IP destination address is examined and one or more labels are generated which relate to the topology of the network. The labels can include QoS information. The packet is then sent to the destination via a label switched path. At the destination the packet may be sent on via a further label switched path by examining the IP address from the received label and generating one or more fresh labels for the passage of the packet through the further label switched path.

27 Claims, 3 Drawing Sheets

OTHER PUBLICATIONS

*Reverse Path Accumulation*, IBM Technical Disclosure Bulletin, IBM Corp., New York, US, vol. 35, No. 4B, Sep. 1, 1992, pp. 128-129.

Armitage G., *MPLS: The Magic Behind the Myths*, IEEE Communications Magazine, IEEE Service Center, Piscataway, NJ, US, vol. 38, No. 1, Jan. 2000, pp. 124-131.

McManus, J., et al., *Broadband to the Home: A Bell Atlantic Perspective*, Community Networking Proceedings, 1997 Fourth International Workshop on Atlanta, GA, USA, Sep. 11-12, 1997, pp. 25-30.

Plasser, E., et al., *Deployment of Adapted IP Over ATM in Access Networks*, Proceedings of the European Conference on Networks and Optical Communications 1999, NOC '99. Core Networks and Network Management, Amsterdam: IOS Press, NL, vol. Part 2, 1999, pp. 309-314.

Maxemchuk, N.F., et al., *Active Routing*, IEEE Journal on Selected Areas in Communications, IEEE Inc., New York, US, vol. 19, No. 3, Mar. 2001, pp. 552-565.

Li, T, et al., *A Provider Architecture for Differentiated Services and Traffic Engineering (PASTE)*, IETF RFC 2430, Oct. 1998, pp. 1-2.

\* cited by examiner

NETWORK TUNNELLING

This invention relates to the use of tunnelling techniques for routing data through portions of a network where the addresses of various network elements are not known at either the source or destination.

A variety of tunnelling techniques are known and are commonly used in network technology. They mostly rely on adding additional routing information to a data packet when it is being routed through a network to disguise the eventual destination and, at some point, mapping of private and public IP addresses.

Multi Protocol Label Switching MPLS has been developed to integrate OSI layer 2 information about network links such as bandwidth, latency and utilization into layer 3 (IP) within a particular autonomous system or ISP, in order to simplify and improve IP packet exchange. MPLS gives network operators flexibility to divert and route traffic around link failures, congestion and bottlenecks.

When packets enter a MPLS based network, label edge routers (LERs) give the packet a label. These labels contain routing table entry information and refer to the IP header field, the source IP address, layer 4 socket number information, and differentiated service. Different packets are assigned to corresponding labelled switch paths (LSPs) where label switch routers (LSRs) place outgoing labels on the packets. Network operators can use these LSPs to divert and route traffic based on data-stream type and Internet-access customer.

We have appreciated that MPLS may be used for tunnelling data through a network. Accordingly there is provided a method of sending data through an IP communications network from a first network point to a destination point, the method comprising the steps of attaching at least one label to the data at the first network point based on the destination IP address of the data, the label including routing information through the IP network to the destination point determined by the network topology, and routing the data through the network to the destination point via a label switched path comprising the route included in the at least one label.

The invention also provides a communications network including a first network point, a destination network point, and a plurality of intermediate network points, each of the first and destination network points including means for generating at least one label from the destination IP address of that data, means for attaching the at least one label to the data, and means for routing the data and at least one label to the other of the first and destination network points via a label switched path, the label switched path being determined by the network topology.

Embodiments of the invention have the advantage that labels may be used to tunnel through networks. The labels determine the physical path through the networks rather than MAC addresses or IP address.

Preferably labels may be used to send data packets through two or more networks. At the termination point of a label switched path that connects two networks the destination address can be extracted from a received label and a fresh label or set of labels generated to send the data packet through the further network via a further label switched path.

A label switched path may be used for sending messages to a DHCP server. A DHCP discover message is sent via a label switched path. A public IP address is allocated by the server and sent back to the originator. A router forming the label tunnel endpoint uses the address to generate one or more labels to send the message back via a label switched path.

The invention also provides a method of sending data through an IP communications network comprising a first network point, a destination network point and a plurality of intermediate network points, the method comprising sending a message from the first network point to the destination network point to establish the network topology, mapping the network topology to network IP addresses at the destination point.

The invention also provides a communications network comprising a first network point, a destination network point and a plurality of intermediate network points, the first network point including means for sending a message to the destination network point to establish the network topology, and the destination network point including means for mapping the network topology to network IP addresses.

Embodiments of the invention will now be described, by way of example and with reference to the accompanying drawings, in which.

Use of MPLS for tunnelling has a number of advantages, namely it can be used to determine the physical path through the network. Instead of using MAC or IP addresses to route packets, MPLS can be generated according to the destination of the packets. MPLS can also be used to identify the quality of service requirements of paths through the network and provide multiple paths through the access networks.

The use of MPLS will be described first by considering downstream and upstream tunnelling with reference, respectively, to FIGS. 1 and 2.

Figure 1:
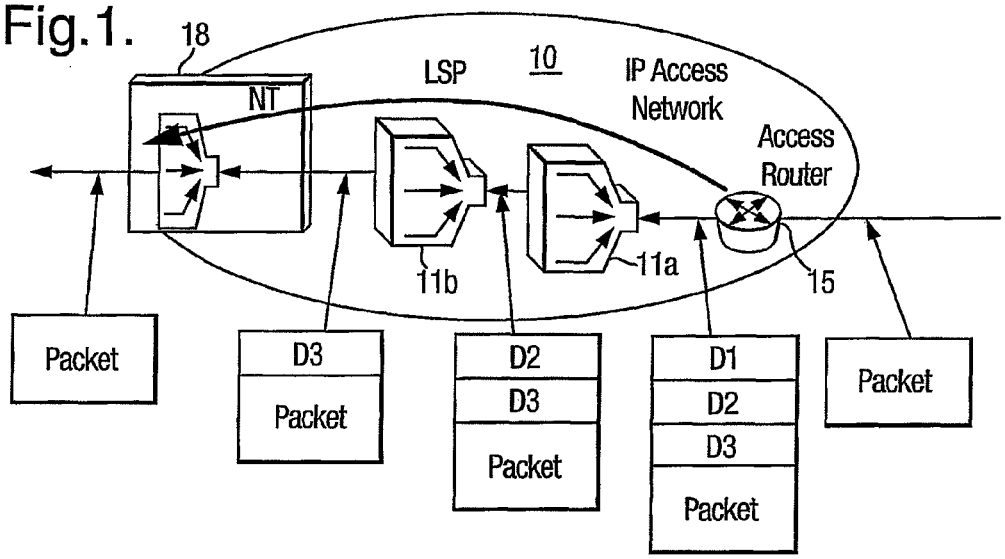
FIG. 1 shows how downstream tunnelling can be achieved using MPLS in an IP access network.

FIG. 1 shows an access network 10 having a network terminator 18, a pair of concentrators 11 and an access network router 15. An explicitly routed LSP (label switched path) is used to tunnel downstream data through the network. The access router 15 keeps a map of IP addresses to MPLS labels. When a packet arrives at the access router, its IP address is examined. Three MPLS labels, D1, D2 and D3 are inserted into the packet and the packet sent to the first stage concentrator 11a. The number of labels attached will be equal to the number of stages in the network through which the packet has to pass. In this case, there are three stages; access router to concentrator 11a; concentrator 11b; and network terminator 18.

The first stage concentrator examines the label on top of the stack D1 and uses it to route the packet, removing that label, D1, from the label stack. D1 may contain the output port number on which the packet is to be transmitted. Label D1 is popped off the label stack and the packet forwarded to the second stage concentrator 11b. Here a similar operation is performed, using label D2 and, according to the destination given by label D2 the packet, now only containing the original packet and label D3 is forwarded to the network terminator. At the NT 18, a similar operation is performed again, with the NT examining the remaining label D3 and routing the bare packet to the appropriate element in the network terminator depending upon the routing information contained in label D3. This final destination is the tunnel endpoint.

The MPLS labels can also be used to provide quality of service QoS management by using a part of the label to allocate a class to the traffic which controls the queueing algorithms used on concentration points.

The embodiment has been described in terms of a label for each stage of the routing through the IP access network. If the MPLS label is off sufficient length, a single label can carry routing and QoS information for more than one stage. This will be described later.

Figure 2:
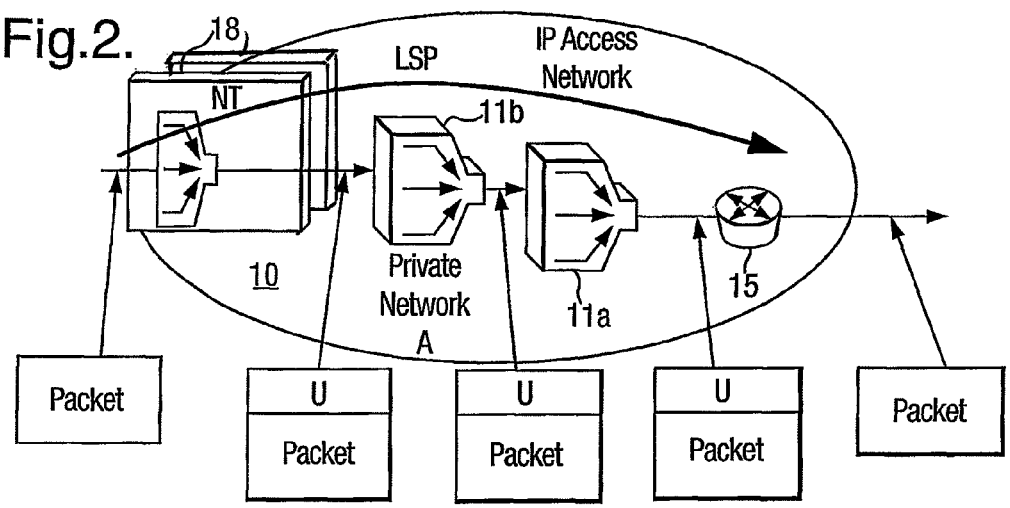
FIG. 2 shows how upstream tunnelling can be achieved in the network of FIG. 1.

Referring now to FIG. 2, upstream routing of packets is more simple as they are all destined for the same point; the access router 15. Thus, a single label only is required and is used by all the stages. The label is not popped up by any of the stages but merely examined before the packet and label is passed on to the next stage. The label is only popped at the access network router. Again, the label, shown as U (upstream) in FIG. 2 can also include QoS information, using different label values for different traffic classes.

It will be appreciated from the discussion of FIGS. 1 and 2 that the access network does not use IP addresses for internal routing of user packets. IP addresses are only used at the extremities of the access network where it has to communicate with external networks, for example at the access router 15 and the network terminator 18. Individual address domains may be used for each type of service offered by the NT, such as video, voice over IP and Internet access to simplify the provision of firewall security.

Figure 3:
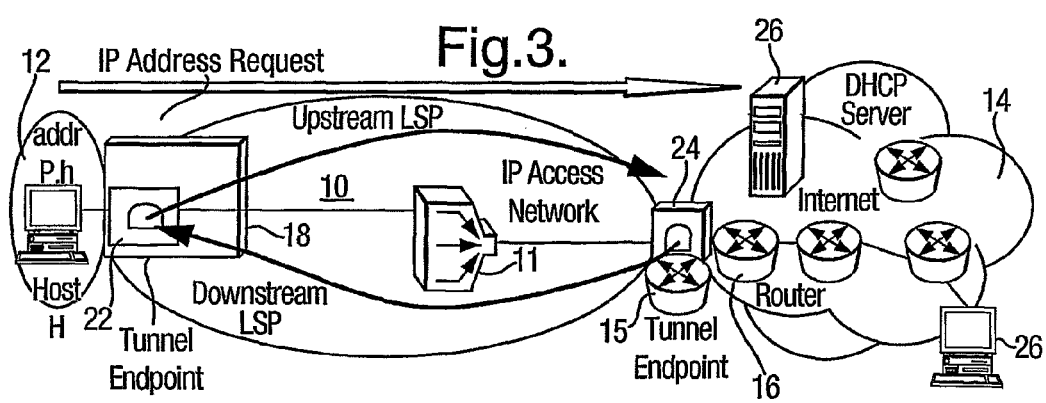
FIG. 3 shows an architecture to provide DHCP with MPLS.

FIG. 3 illustrates how DHCP can be provided with MPLS tunnelling. Like components are shown with the same reference numerals as in previous examples.

The host 12 will request an IP address by generating a DHCP discover message. The DHCP is used to discover the network topology. The DHCP message arrives at the MPLS tunnel entrance 22 in the network terminator 18. The request is sent along the upstream LSP to the access router 15 in the manner described with respect to FIG. 2. The access router here acts as the tunnel endpoint 24. The DHCP discover request will now be acted upon by the DHCP server 26. The tunnel end point stores a map of the network topology. The DHCP server allocates an IP address and sends a public IP address offer back to the client using the determined network topology. Subsequent messages can then have labels generated according to the IP address allocated. To enable this, the access server 15 sets up the necessary mapping from IP address to MPLS label and sends the messages along the downstream LSP back to the client in the manner described with respect to FIG. 1.

Figure 4:
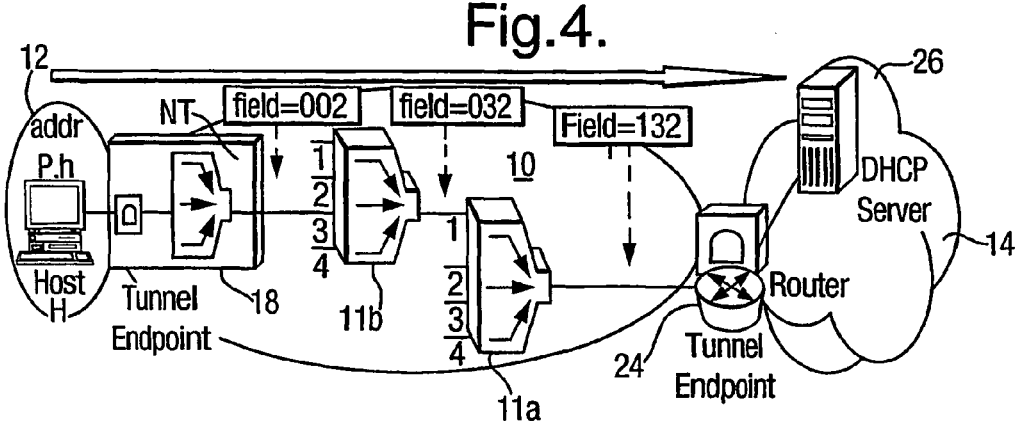
FIG. 4 shows how MPLS labels can be generated automatically.

MPLS labels may be generated automatically. This will be described with reference to FIG. 4. To begin with, a special MPLS label Ud is reserved for DHCP discover and request messages. The network terminator 18 detects the DCHP message as it is an IP Broadcast message.

Broadcast messages are not normally forwarded by the network terminator. The NT inserts the MPLS label Ud and inserts the port number on which the request was received into a reserved field in the DHCP message. In the FIG. 4 example, this is 002 hex. The DHCP request is then forwarded on to the second concentrator stage 11b.

As each concentration stage receives the message it will recognise that the message is a DCHP request as the packet will carry the unique Ud label. The concentrator inserts the port number on which the request was received into some bits of the reserved field and passes the message on. In the present example it can be seen that the message is received at port three of concentrator 110 so the reserved field changes from 002 to 032. At the next concentrator the message is received at port 1 and so the reserved field changes to 132.

When the DCHP message is received at the access router, acting as the tunnel endpoint, the reserved field will contain the port numbers on which the message was received at all the concentrator stages including the network terminator. The DHCP request is sent to the DHCP server 26 and, when a response is received, the reserved field, which must be echoed by the DHCP server, can be used to generate MPLS routing labels for the downstream path from the access router 15 to the network terminator 18.

One field which may be used as the reserved field is the chaddr field. If unicast DHCP renewals are used by clients, the NT also has to detect such renewals as a special case in order that the correct MPLS label can be applied.

So far, MPLS tunnels have been described purely within access networks. Access tunnels may be integrated with external MPLS tunnels as will be described with reference to FIGS. 5 and 6. The purpose of such integration is to enable the QoS attributes of the external tunnel to be maintained in the access network.

Figure 5:
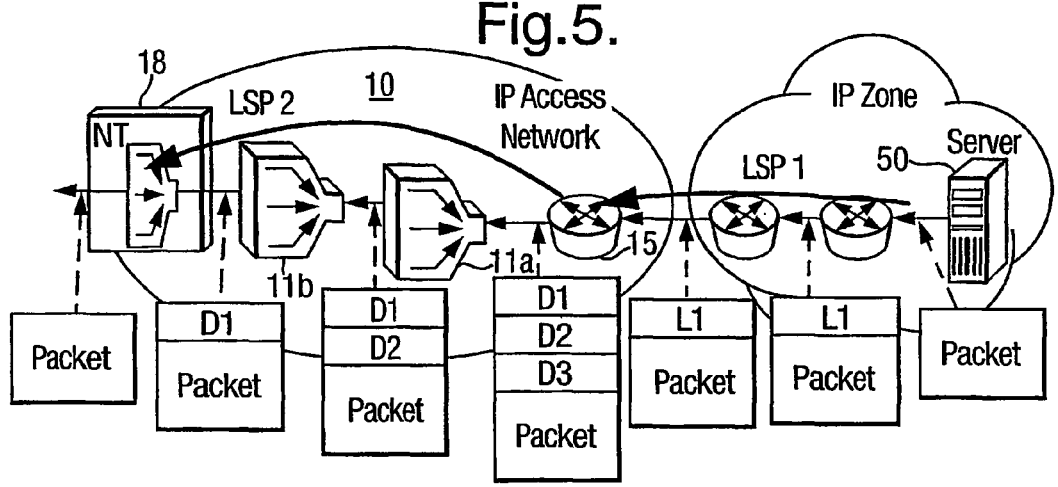
FIG. 5 shows downstream integration of MPLS tunnels.

FIG. 5 illustrates how this may be achieved for downstream messages. Here there are two separate downstream tunnels, LSP1 and LSP2. In the first tunnel, a packet is sent from server 50 to the IP access network router 15. This packet has an attached label Li which includes quality of service management information. The access router 15 terminates the tunnel LSP1 and pops the label Li extracting the QoS management information and the destination and generates labels D1 to D3, or whatever labels are required as discussed with respect to FIG. 1. The QoS characteristics of tunnel LSP1 can be carried into these new labels so that the appropriate queues are used to forward the packets within the access network.

Figure 6:
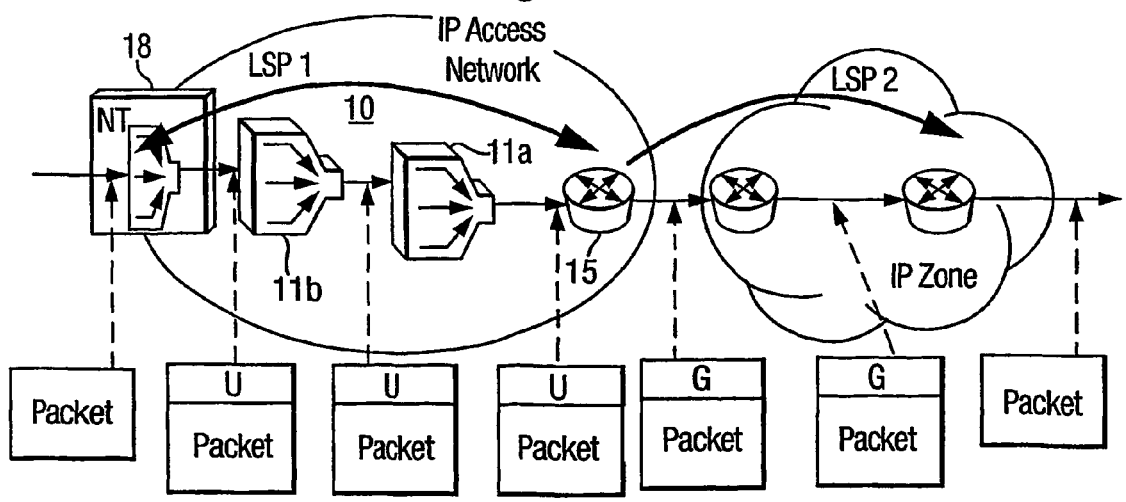
FIG. 6 shows upstream integration of MPLS tunnels.

In FIG. 6, upstream tunnels are easily integrated by extracting the quality of service information specified in an upstream label U in the access network at the access network router 15 and inserting it into the label of the second tunnel LSP2 to maintain continuity. Thus the QoS characteristics of the tunnel LSP1 can be carried forward into the creation of labels for LSP2.

Figure 7:
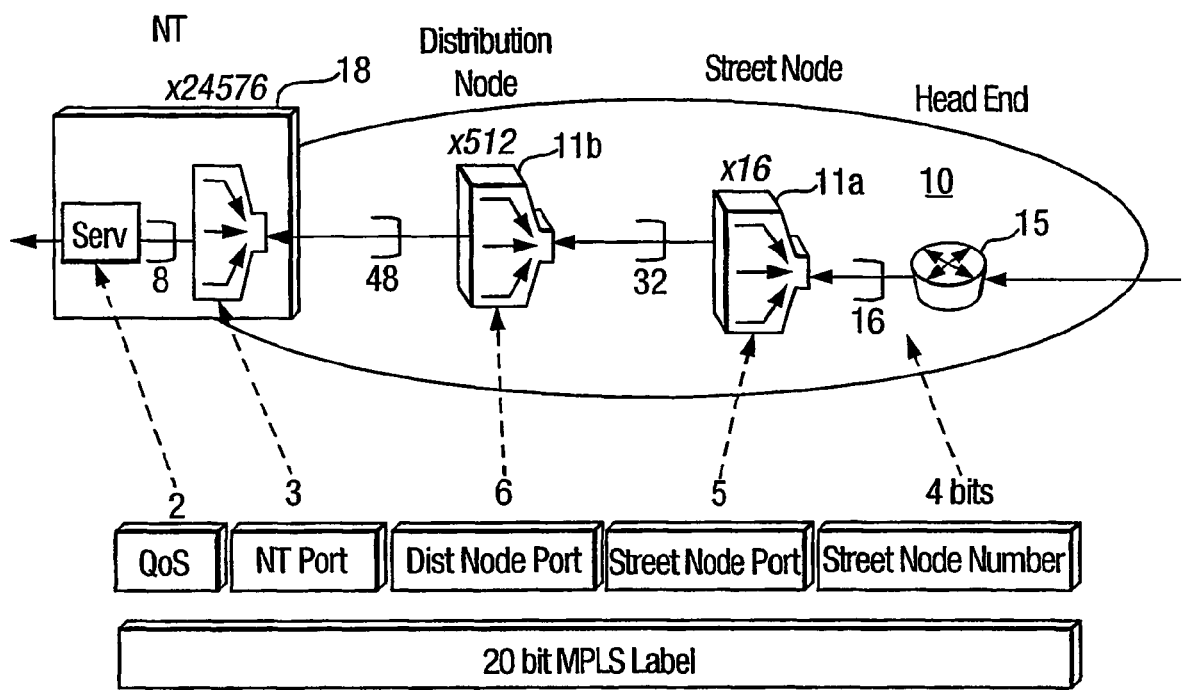
FIG. 7 shows the allocation of a single MPLS label for explicitly downstream routing.

It was mentioned earlier that downstream messages, which include several labels need not necessarily use a separate label for each stage. FIG. 7 shows how a 20 bit Ethernet coded MPLS label could be allocated in a three stage access network. In FIG. 7, the two concentrator stages 11a, 11b are identified as street nodes and distribution nodes respectively. The access router is connected to 16 street nodes, each of which are connected to 32 distribution nodes, giving a total of 512 distribution nodes. The distribution nodes are each connected to 48 NTs; a total of 24576 NTs. Each of the NTs is connected to 8 service points each of which can be provided with one of four levels of Q0S. The 20 bit MPLS label is therefore made up of 4 bits street node number, 5 bits street node port, 6 bits distribution node port, 3 bits NT port and 2 bits QoS.

Tradeoffs may be made in the bit allocations. For example, 32 street nodes each parenting 16 distribution nodes could be supported by allocating 5 bit to the street node number and four bits to the street node port number. At present, a two bit QoS is sufficient as only four levels of QoS are used: video, voice, LAN data and management but the above allocation allows for eight for future use. The number of service points may be reduced to four, using 2 MPLS bits, and the number of QoS levels reduced to 2, using a single MPLS bit. This releases two further bits to allow, for example, 32 street nodes to support up to 64 distribution nodes each.

It will be appreciated that in each of the embodiments described, MPLS has been used in tunnelling techniques to send data through an access network which uses private internal addresses or public addresses. In each case, data can pass through the network without the need to know those private addresses. This has the advantage, for example of making it possible to construct access networks using private internal addresses so reducing the need to use scarce public IP addresses in such networks. Furthermore, by using MPLS labels, QoS information can be included at the same time.

The description has been given purelt in relation to label generation. However, the use of DHCP discover messages to establish network topology has broader application. The network topology is mapped to IP addresses at the server. As well as being useful for generating labels, this data can be used for other purposes such as admission and access control.

Variations and modifications to the embodiments are possible and will occur to those skilled in the art. For example, MPLS may be used for tunnelling in other circumstances and the invention is not limited to public or private access networks. Such modifications are within the scope of the present invention.

The invention claimed is:

1. A method of sending data through an Internet Protocol (IP) access network between an edge router and a plurality of network terminals via intermediate network stages, the method comprising the steps of:
   a) at each network terminal, attaching a respective predetermined label to first data destined for the edge router, the label including information identifying a route through the IP network from the respective network terminal to the edge router, each route being determined by network topology; and
   b) routing the first data through the IP network from the respective network terminals to the edge router via a respective label switched path comprising the route identified in the respective predetermined label attached by the respective network terminal, by using the information in the respective predetermined label at all the intermediate stages of the IP network wherein the respective predetermined labels are not swapped at the intermediate stages such that only a single predetermined label is used by the intermediate stage in each label switched path.

2. The method according to claim 1, comprising the step of attaching a plurality of labels to second data at the edge router destined for a respective network terminal, the labels including information identifying a route through the IP network from the edge router to the network terminal determined by the network topology; and routing the second data through the IP network from the edge router to the network terminal via another label switched path comprising the route identified in the plurality of labels.

3. The method according to claim 2, in which the other label switched path comprises a number of intermediate points, in which the method includes the step of removing one of the plurality of labels from the second data at each intermediate point of the IP network that the second data passes through and using it to route the second data.

4. The method according to claim 1, in which the labels are multi protocol label switching (MPLS) labels.

5. The method according to claim 1, in which the labels include quality of service information.

6. The method according to claim 1, in which the IP network includes a client terminal attached to a said network terminal and a dynamic host configuration protocol (DHCP) server, the method comprising the steps of sending a DHCP discover message from the network terminal via the label switched path to the edge router, forwarding the DHCP discover message to the DHCP server, and allocating a public IP address to the client terminal originating the DHCP discover message.

7. The method according to claim 6, in which the edge router maps the allocated public IP address of the client terminal originating the DHCP discover message to the labels associated with the network terminal.

8. The method according to claim 7, in which the edge router sends a message from the DHCP server including the public IP address via the label switched path to the network terminal.

9. The method according to claim 8, in which the network terminal receives the respective predetermined label and forwards the message from the DHCP server to the client terminal originating the message.

10. The method according to claim 9, comprising the steps of inserting a port number on which the DHCP message is received at each intermediate stage of the label switched path into a reserved field within the message; and generating routing labels for routing of the message from the DHCP server to the network terminal from port numbers in the reserved field.

11. The method according to claim 10, in which each routing label is generated at the edge router.

12. The method according to claim 1, further comprising the steps of tunneling third data from a first said network terminal to the edge router inside a respective label switched path and, at the edge router, removing the label attached to the third data received from the first network terminal, and extracting an ultimate IP destination address therefrom, and generating a plurality of labels to enable the third data to be sent to a second said network terminal via a further label switched path.

13. The method according to claim 12, including, at the edge router, the steps of removing the respective predetermined label attached to the first data received from the second network terminal, and extracting the ultimate IP destination address therefrom, and generating at least one label for attachment to the first data for sending to the first network terminal via a further label switched path.

14. The method according to claim 13, in which the respective predetermined label comprises quality of service information from the second network terminal; and the steps of extracting the quality of service information, and using the extracted quality of service information in the generation of the at least one label.

15. An Internet Protocol (IP) access network including an edge router and a plurality of network terminals coupled to the edge router by a plurality of intermediate network points, in which:
   a) the network terminals are each arranged to attach a respective predetermined label to first data destined for the edge router; and
   b) the network being arranged to route the respective first data and the respective predetermined label to the edge router via a respective label switched path by examining routing information in the predetermined labels at the intermediate network points, the label switched paths being determined by network topology, wherein the respective predetermined labels are not swapped at the intermediate stages such that only a single predetermined label is used by the intermediate states in each label switched path.

16. The access network according to claim 15, in which the edge router comprises means for generating a plurality of labels from a destination IP address of second data, means for attaching the plurality of labels to the second data, and means for routing the second data and the plurality of labels from the edge router to a said network terminal via another label switched path determined by the network topology.

17. The access network according to claim 16, in which each intermediate network point comprises means for removing one of the plurality of labels from the second data and using it to route the second data.

18. The access network according to claim 17, in which the edge router comprises means for attaching a label for each of the intermediate network points and the network terminal to the second data.

19. The access network according to claim 18, in which the labels are multi protocol label switching (MPLS) labels.

20. The access network according to claim 19, in which each label comprises quality of service information.

21. The access network according to claim 18, comprising a dynamic host configuration protocol (DHCP) server, in which the data comprises a DHCP discover message from a client terminal connected to a said network terminal to establish the topology of the network, in which the network terminal comprises means for forwarding the DHCP discover message to the edge router via the label switched path, and in which the DHCP server comprises means for allocating a public IP address of the client terminal to the network topology.

22. The access network according to claim 21, in which the edge router comprises means for sending a message from the DHCP server including the public IP address via a label switched path to the network terminal.

23. The access network according to claim 22, in which the DHCP message comprises a reserved field, and each intermediate network point in the label switched path comprises means for inserting a port number on which the message was received into the reserved field.

24. The access network according to claim 23, in which a first network terminal has means for generating labels to send data to the edge router via a respective label switched path, the edge router comprising means for removing a label from the data received from the first network terminal, for extracting the IP address of a message destination and for generating a plurality of labels for attachment to the data for sending the data to a second network terminal via a further label switched path.

25. The access network according to claim 24, in which the edge router comprises means for extracting quality of service information from the label removed from the data, and in which the plurality of labels generated at the edge router comprises the extracted quality of service information.

26. The access network according to claim 25, in which the edge router comprises means for removing the single label attached to the data received from the second network terminal and extracting an ultimate IP destination address therefrom, and for generating at least one label for attachment to the data for sending the data to the first network terminal via a further label switched path.

27. The access network according to claim 26, in which the edge router comprises means for extracting quality of service information from the label from the second network terminal in which the at least one label generated at the edge router comprises the extracted quality of service information.

* * * * *